United States Patent
Lin et al.

(10) Patent No.: US 7,760,450 B2
(45) Date of Patent: Jul. 20, 2010

(54) LENS SYSTEM

(75) Inventors: Mei-Chun Lin, Taipei Hsien (TW); Chun-Hsiang Huang, Taipei Hsien (TW); Hsin-Tsung Yeh, Taipei Hsien (TW); Wei-Hsiu Chang, Taipei Hsien (TW); Kuang-Wei Lin, Taipei Hsien (TW); Kuan-Ting Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/465,609

(22) Filed: May 13, 2009

(65) Prior Publication Data

US 2010/0110569 A1 May 6, 2010

(30) Foreign Application Priority Data

Oct. 30, 2008 (CN) .......................... 200810305290

(51) Int. Cl.
- *G02B 7/02* (2006.01)
- *G02B 9/08* (2006.01)
- *G02B 3/02* (2006.01)

(52) U.S. Cl. ..................... 359/819; 359/664; 359/708; 359/740; 359/793

(58) Field of Classification Search ................. 359/664, 359/708, 738–740, 793–795, 819
See application file for complete search history.

(56) References Cited

U.S. PATENT DOCUMENTS

| | | | |
|---|---|---|---|
| 7,688,532 B1* | 3/2010 | Lin et al. ..................... 359/819 |
| 2004/0042088 A1* | 3/2004 | Ito .............................. 359/819 |
| 2008/0186597 A1* | 8/2008 | Eguchi ........................ 359/819 |

\* cited by examiner

*Primary Examiner*—Darryl J Collins
(74) *Attorney, Agent, or Firm*—Zhigang Ma

(57) ABSTRACT

A lens system includes a first lens and a second lens in order from the object side thereof. The first lens includes a first optical portion and a first mounting portion surrounding the first optical portion. The second lens includes a second optical portion with a convex object side surface, and a second mounting portion surrounding the second optical portion. The convex object side surface includes an optical surface at the center thereof and a first connecting surface surrounding the optical surface. The second mounting portion includes a second connecting surface surrounding the first connecting surface. Wherein the angle measured anti-clockwise from the first connecting surface to the axis of the lens system satisfies a certain condition.

10 Claims, 2 Drawing Sheets

LENS SYSTEM

BACKGROUND

1. Technical Field

The present disclosure relates to lens systems and, particularly, to a lens system capable of reducing ghost or flare.

2. Description of Related Art

With the development of the optical imaging technology, camera modules are becoming widely used in electronic devices, such as digital cameras and mobile phones.

A lens of a camera module often includes an optical portion located at the center thereof and a mounting portion surrounding the optical portion. The mounting portion engages a spacer or barrel of a camera module, to easily secure the lens. The light from an object incident on the mounting portion surrounding the optical portion is usually reflected to the image side and forms a ghost or flare, thus degrading the quality of the image captured by the lens system.

What is needed, therefore, is a lens system which can overcome or at least alleviate the above-described problem.

BRIEF DESCRIPTION OF THE DRAWINGS

Many aspects of the present lens system can be better understood with reference to the accompanying drawings. The components in the drawings are not necessarily drawn to scale, the emphasis instead being placed upon clearly illustrating the principles of the present lens system.

DETAILED DESCRIPTION

Embodiments of the present disclosure will now be described in detail below, with reference to the accompanying drawings.

Figure 1:
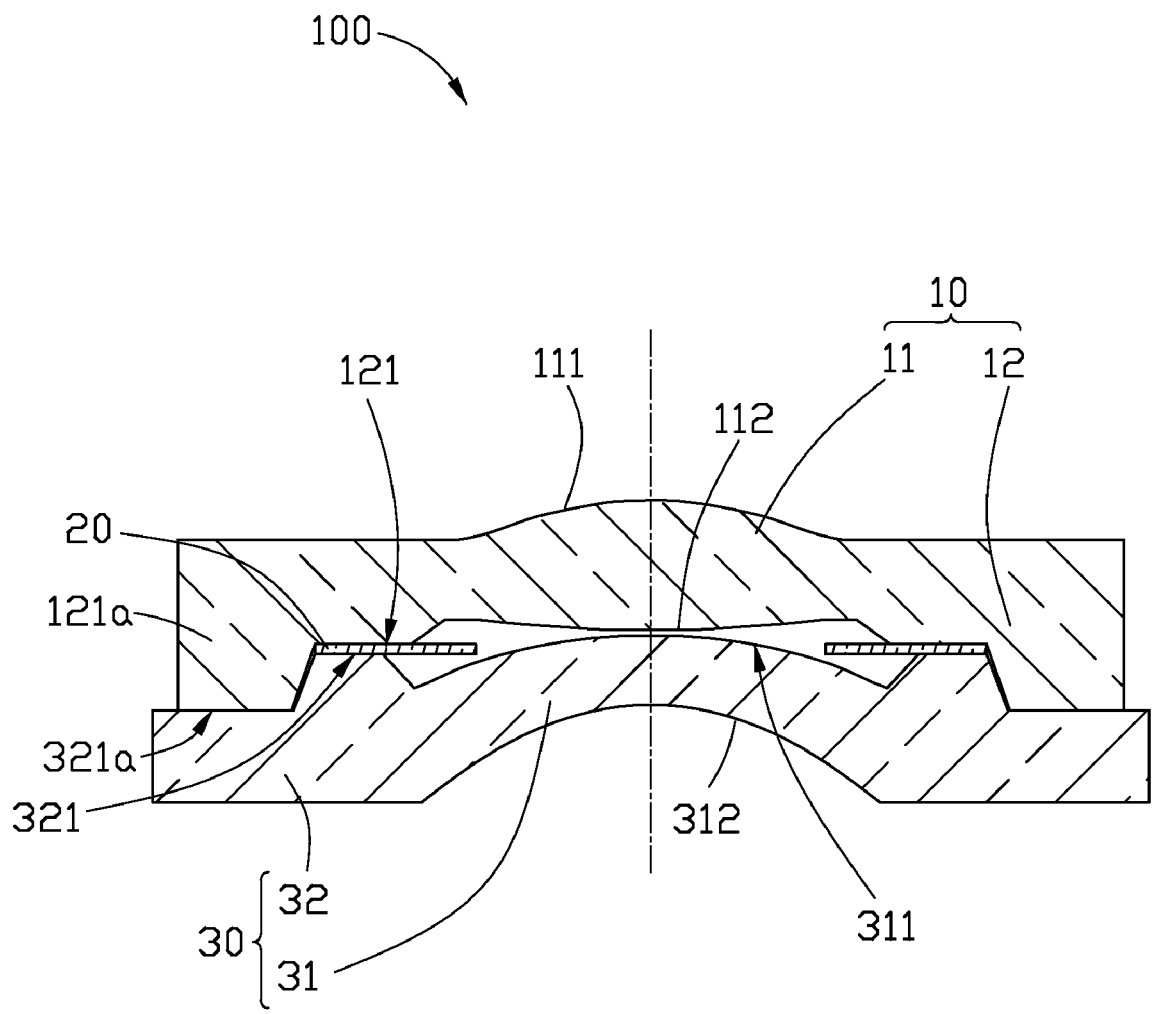
FIG. 1 is a schematic view of a lens system according to an exemplary embodiment.

Referring to FIG. 1, a lens system 100, according to an exemplary embodiment, is shown. The lens system 100 includes a first lens 10, a stop 20, and a second lens 30 in order from the object side to the image side of the lens system 100.

The first lens 10 includes a first optical portion 11 and a first mounting portion 12 surrounding the first optical portion 11. The first optical portion 11 is configured for refracting a portion of light incident on the first optical portion 11 from an object to the second lens 30. The first optical portion 11 includes an object side surface 111 and an image side surface 112 facing the second lens 30. The first mounting portion 12 is configured for contacting a barrel (not shown) and/or spacer (not shown) etc., to secure the first lens 10. The first mounting portion 12 includes a first engaging surface 121 facing the second lens 30. Protrusions and/or recesses can be formed on the first engaging surface 121. In this embodiment, a ring-shaped protrusion 121a is formed on the first engaging surface 121. The first lens 10 can be plastic or glass.

The second lens 30 includes a second optical portion 31 and a second mounting portion 32 surrounding the second optical portion 31. The second optical portion 31 is aligned with the first optical portion 11 of the fist lens 10 along an optical axis of the lens system 100 and configured for refracting a portion of light incident on the second optical portion 31 from an object towards an image sensor (not shown) to form an image of the object. The second mounting portion 32 is configured for contacting a barrel (not shown) and/or spacer (not shown) etc., to secure the second lens 30. The second optical portion 31 includes an object side surface 311 facing the first lens 10 and an image side surface 312 away from the first lens 10. The object side surface 311 is convex, and can be spherical surface or aspherical surface. The second lens 30 can be plastic or glass.

The second mounting portion 32 includes a second engaging surface 321 facing the first lens 10. Protrusions and/or recesses can be formed on the second engaging surface 321. In this embodiment, a ring-shaped recess 321a is defined on the second engaging surface 321 for engaging with the ring-shaped protrusion 121a on the first engaging surface 121. The precision of the alignment of the first lens 10 and the second lens 30 is a most important factor determining the image quality of the lens system 100. By using the ring-shaped recess 321a and the ring-shaped protrusion 121a, the first lens 10 and the second lens 30 can be precisely aligned, accordingly, the image quality of the lens system 100 can be improved.

Figure 2:
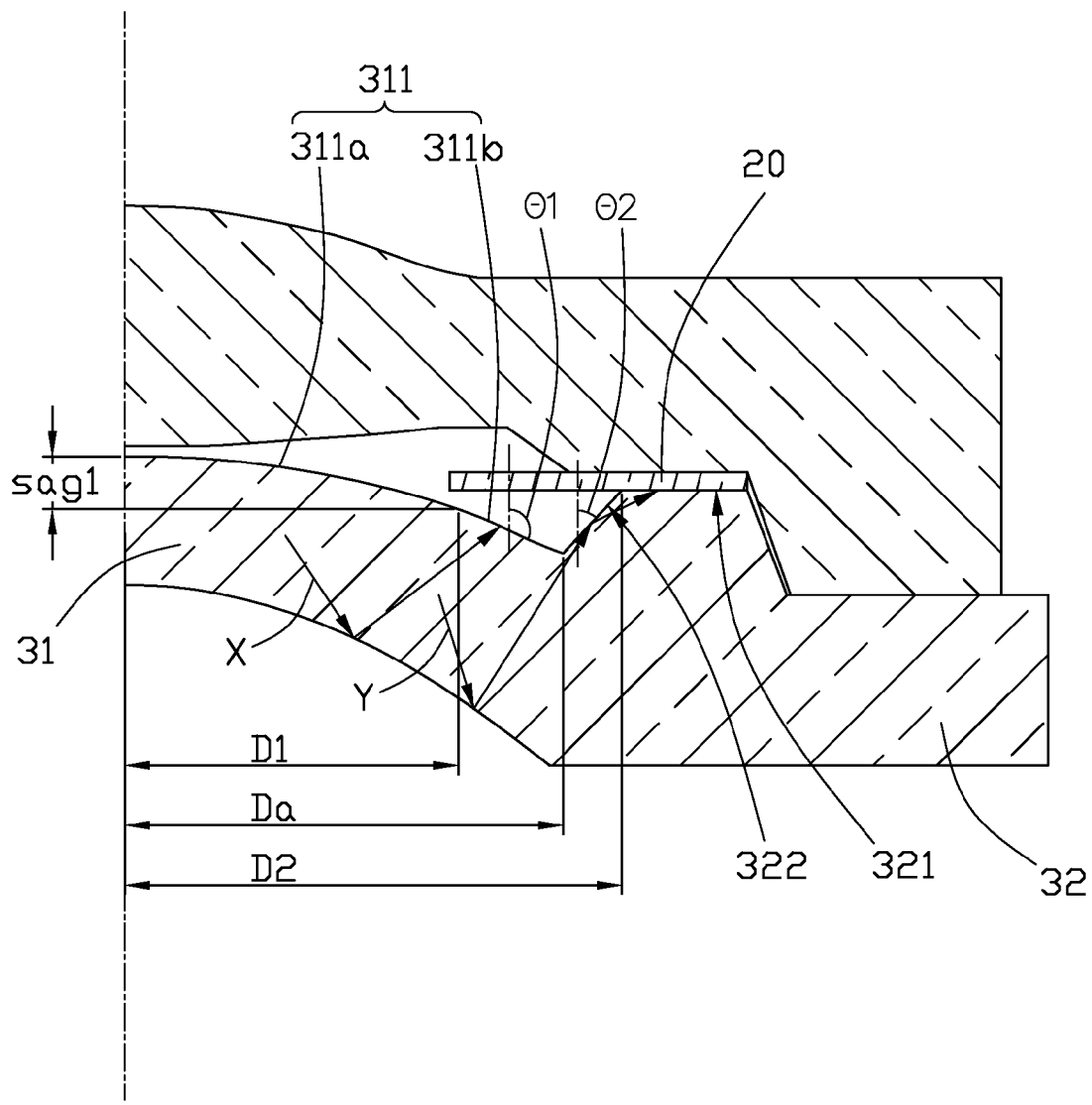
FIG. 2 is a magnified view of a portion of the lens system of FIG. 1.

Further referring to FIG. 2, the object side surface 311 of the second optical portion 31 includes an optical surface 311a at the center of the object side surface 311 and a first connecting surface 311b surrounding the optical surface 311a. The second mounting portion 32 further includes a second connecting surface 322 surrounding the first connecting surface 311b. The second connecting surface 322 connects the second engaging surface 321 and the first connecting surface 311b of the object side surface 311 of the second optical portion 31. In order to improve the image quality of the lens system 100, the first connecting surface 311b satisfies a first condition:

$$\tan^{-1}\left(\frac{D1}{sag1}\right) \le \theta 1 \le \tan^{-1}\left(\frac{D1}{sag1}\right) \times \left(1 + \frac{Da - D1}{D2 - D1}\right),$$

wherein D1 is the semi-diameter of the optical surface 311a, sag1 is the height of the optical surface 311a along the axis of the lens system 100, θ1 is an angle measured anti-clockwise from the first connecting surface 311b to the axis of the lens system 100, Da is the outer semi-diameter of the first connecting surface 311b, and D2 is the outer semi-diameter of the second connecting surface 322.

The first condition is configured for increasing the transmissivity of a stray light X incident on the first connecting surface 311b, after being reflected by the image side surface 312 of the second optical portion 31, by decreasing incident angle of the stray light X on the first connecting surface 311b. Because the object side surface 311 is convex, most of the stray light X reflected by the first connecting surface 311b will come back to the image side of the lens system 100, and affect the quality of the image captured by the lens system 100. Therefore, increasing the transmissivity of the stray light X incident on the first connecting surface 311b can decrease the amount of the stray light X reflected by the first connecting surface 311b, and accordingly, can increase the quality of the image captured by the lens system 100.

In order to further improve the image quality of the lens system 100, the second connecting surface 322 satisfies a second condition:

$$(180 - \theta 1) \le \theta 2 \le \left[\left(2.5 + \frac{Da - D1}{D2 - D1}\right) \times 90 - \left(1.5 + \frac{Da - D1}{D2 - D1}\right) \times \theta 1\right],$$

wherein θ2 is an angle measured anti-clockwise from the second connecting surface 322 to the axis of the lens system 100.

During capturing an image of an object by the lens system 100 satisfying the second condition, a stray light Y incident on the second connecting surface 322, after being reflected by the image side surface 312 of the second optical portion 31, will be reflected towards the object side of the lens system 100 by the second connecting surface 322. Accordingly, the stray light Y, as shown in the drawing, cannot significantly affect the quality of the image captured by the lens system 100, and the image quality of the lens system 100 can be improved.

The stop 20 is arranged between the first lens 10 and the second lens 30. The stop 20 is configured for reducing the amount of light from an object entering the lens system 100. The stop 20 is black in color and can absorb light incident thereon. Preferably, the inner semi-diameter of the stop 20 is smaller than the semi-diameter of the optical surface 311a to prevent the light from an object incident on the first connecting surface 311b just after being refracted by the first optical portion 11 of the first lens 10.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A lens system comprising, in order from the object side:
   a first lens comprising a first optical portion and a first mounting portion surrounding the first optical portion; and
   a second lens comprising:
      a second optical portion with a convex object side surface, the convex object side surface comprising an optical surface at the center thereof and a first connecting surface surrounding the optical surface; and
      a second mounting portion surrounding the second optical portion, the second mounting portion comprising a second connecting surface surrounding the first connecting surface,
   wherein the lens system satisfies the following condition:

$$\tan^{-1}\left(\frac{D1}{sag1}\right) \le \theta 1 \le \tan^{-1}\left(\frac{D1}{sag1}\right) \times \left(1 + \frac{Da - D1}{D2 - D1}\right)$$

wherein D1 is the semi-diameter of the optical surface, sag1 is the height of the optical surface along the axis of the lens system, θ1 is an angle measured anti-clockwise from the first connecting surface to the axis of the lens system, Da is the outer semi-diameter of the first connecting surface, and D2 is the outer semi-diameter of the second connecting surface.

2. The lens system as claimed in claim 1, wherein the lens system further satisfies the following condition:

$$(180 - \theta 1) \le \theta 2 \le \left[\left(2.5 + \frac{Da - D1}{D2 - D1}\right) \times 90 - \left(1.5 + \frac{Da - D1}{D2 - D1}\right) \times \theta 1\right],$$

wherein θ2 is an angle measured anti-clockwise from the second connecting surface to the axis of the lens system.

3. The lens system as claimed in claim 1, wherein the first mounting portion of the first lens comprises a first engaging surface facing the second lens, and the second mounting portion of the second lens comprises a second engaging surface for engaging with the first engaging surface, the second engaging surface is located surrounding the second connecting surface of the second mounting portion.

4. The lens system as claimed in claim 3, wherein a ring-shaped protrusion is formed on the first engaging surface, and a ring-shaped recess is defined on the second engaging surface corresponding to the ring-shaped protrusion on the first engaging surface.

5. The lens system as claimed in claim 1, further comprising a stop arranged between the first lens and the second lens.

6. The lens system as claimed in claim 5, wherein the inner semi-diameter of the stop is smaller than the semi-diameter of the optical surface of the convex object side surface of the second optical portion.

7. The lens system as claimed in claim 5, wherein the stop is black in color.

8. The lens system as claimed in claim 1, wherein the first lens is plastic or glass.

9. The lens system as claimed in claim 1, wherein the second lens is plastic or glass.

10. The lens system as claimed in claim 1, wherein the convex object side surface of the second optical portion is spherical surface or aspherical surface.

* * * * *